United States Patent
Wanamaker et al.

(10) Patent No.: US 10,019,405 B2
(45) Date of Patent: Jul. 10, 2018

(54) APPARATUS AND METHOD FOR TRANSMITTING SERIAL ATA INFORMATION

(71) Applicant: MICROSEMI STORAGE SOLUTIONS (U.S.), INC., Aliso Viejo, CA (US)

(72) Inventors: Neil Timothy Wanamaker, San Jose, CA (US); Timothy James Symons, Anmore, CA (US)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 219 days.

(21) Appl. No.: 15/185,535

(22) Filed: Jun. 17, 2016

(65) Prior Publication Data
US 2016/0371224 A1    Dec. 22, 2016

Related U.S. Application Data

(60) Provisional application No. 62/182,101, filed on Jun. 19, 2015.

(51) Int. Cl.
*G06F 13/42* (2006.01)
*G06F 13/362* (2006.01)
*G06F 13/40* (2006.01)

(52) U.S. Cl.
CPC ........ *G06F 13/4286* (2013.01); *G06F 13/362* (2013.01); *G06F 13/4068* (2013.01); *G06F 2213/0028* (2013.01); *G06F 2213/0032* (2013.01)

(58) Field of Classification Search
None
See application file for complete search history.

(56) References Cited

U.S. PATENT DOCUMENTS

| | | | | |
|---|---|---|---|---|
| 7,370,128 B2 * | 5/2008 | Douglas | ............... | G06F 13/387 710/315 |
| 7,506,080 B2 * | 3/2009 | Lau | ......................... | G06F 13/28 370/395.5 |
| 7,539,798 B2 * | 5/2009 | Voorhees | ................ | G06F 3/061 710/10 |
| 7,545,868 B2 * | 6/2009 | Kennedy | .............. | H04B 1/7163 375/222 |
| 7,721,021 B2 * | 5/2010 | Johnson | .............. | G06F 21/6218 709/223 |
| 7,814,245 B2 * | 10/2010 | Schauer | ................ | G06F 3/0607 710/62 |

(Continued)

FOREIGN PATENT DOCUMENTS

| | | |
|---|---|---|
| GB | 2419984 A | 5/2006 |
| WO | 2008124775 A2 | 10/2008 |

*Primary Examiner* — Cheng-Yuan Tseng
(74) *Attorney, Agent, or Firm* — Leber IP Law; Dennis R. Haszko

(57) ABSTRACT

A method and system are provided for transmitting SATA (serial advanced technology attachment) information. In an implementation, SATA commands are passed to an expander, rather than SCSI (Small Computer System Interface) commands. In an example implementation, SATA protocol elements are encapsulated into SAS (Serial Attached SCSI)-like frames and transmitted using the SSP (Serial SCSI protocol) and using SSP hardware.

17 Claims, 15 Drawing Sheets

(56) References Cited

U.S. PATENT DOCUMENTS 8,051,436 B2 * 11/2011 Jones .................... G06F 3/0607
719/326
8,255,607 B2 * 8/2012 Jones ................. G06F 13/4027
710/316

* cited by examiner

| Byte\bit | 7 | 6 | 5 | 4 | 3 | 2 | 1 | 0 |
|---|---|---|---|---|---|---|---|---|
| 0 | Frame Type | | | | | | | |
| 1 | Hashed destination address | | | | | | | |
| 2 | | | | | | | | |
| 3 | | | | | | | | |
| 4 | Reserved | | | | | | | |
| 5 | Hashed source address | | | | | | | |
| 6 | | | | | | | | |
| 7 | | | | | | | | |
| 8 | Reserved | | | | | | | |
| 9 | Reserved | | | | | | | |
| 10 | Reserved | | | TLR QI | | Retry data frames | Re-transmit | CDP |
| 11 | Reserved | | | | # fill bytes | | | |
| 12 | Reserved | | | | | | | |
| : | | | | | | | | |
| 15 | | | | | | | | |
| 16 | Initiator Tag | | | | | | | |
| 17 | | | | | | | | |
| 18 | Target Tag | | | | | | | |
| 19 | | | | | | | | |
| 20 | Relative Offset | | | | | | | |
| : | | | | | | | | |
| 23 | | | | | | | | |
| 24 | Information Unit | | | | | | | |
| : | | | | | | | | |
| | Fill bytes (if any) | | | | | | | |
| n-3 | CRC | | | | | | | |
| : | | | | | | | | |
| n | | | | | | | | |

FIG. 4

| Byte/bit | 7 | 6 | 5 | 4 | 3 | 2 | 1 | 0 |
|---|---|---|---|---|---|---|---|---|
| 0 | FIS type (27h) | | | | | | | |
| 1 | C | Reserved | | | | | | |
| 2 | (ATA) Command | | | | | | | |
| 3 | Features(7:0) | | | | | | | |
| 4 | LBA(7:0) | | | | | | | |
| 5 | LBA(15:8) | | | | | | | |
| 6 | LBA(23:16) | | | | | | | |
| 7 | Device(7:0) | | | | | | | |
| 8 | LBA(31:24) | | | | | | | |
| 9 | LBA(39:31) | | | | | | | |
| 10 | LBA(47:40) | | | | | | | |
| 11 | Features(15:8) | | | | | | | |
| 12 | Count(7:0) | | | | | | | |
| 13 | Count(15:8) | | | | | | | |
| 14 | ICC(7:0) | | | | | | | |
| 15 | Control(7:0) | | | | | | | |
| 16 | Auxiliary(7:0) | | | | | | | |
| 17 | Auxiliary(15:8) | | | | | | | |
| 18 | Auxiliary(23:16) | | | | | | | |
| 19 | Auxiliary(31:24) | | | | | | | |
| 20 | FFE | NCQRLE | SRST | ABRT | RSV | REL | Reserved | |
| 21 : 27 | Reserved | | | | | | | |

FIG. 5

| Byte·bit | 7 | 6 | 5 | 4 | 3 | 2 | 1 | 0 |
|---|---|---|---|---|---|---|---|---|
| 0 | Reserved | | | | | | | |
| : | | | | | | | | |
| 9 | | | | | | | | |
| 10 | Reserved | | | | | | SDA | RDA |
| 11 | Status | | | | | | | |
| 12 | Reserved | | | | | | | |
| : | | | | | | | | |
| 15 | | | | | | | | |
| 16 | Sense Length = n bytes | | | | | | | |
| : | | | | | | | | |
| 19 | | | | | | | | |
| 20 | Response Length = m bytes | | | | | | | |
| : | | | | | | | | |
| 23 | | | | | | | | |
| 24 | | | | | | | | |

| | |
|---|---|
| : | Response Data (if any) |
| 23+m | |
| 24+m | |
| : | Sense Data (if any) |
| 23+m+n | |

FIG. 6

| 0 | |
|---|---|
| : | Requested offset |
| 3 | |
| 4 | |
| : | Number of bytes |
| 7 | |
| 8 | |
| : | Reserved |
| 15 | |

FIG. 7

APPARATUS AND METHOD FOR TRANSMITTING SERIAL ATA INFORMATION

CROSS REFERENCE TO RELATED APPLICATIONS

This application is a non-provisional application which claims the benefit of U.S. Provisional Patent Application No. 62/182,101 filed Jun. 19, 2015, the contents of which is incorporated herein by reference.

FIELD

The present disclosure relates to data communication, including but not limited to transmission of serial ATA (SATA) information.

BACKGROUND

SATA drives may be attached to servers by tunneling the SATA protocol through a SAS fabric as defined in the serial ATA tunneling protocol (STP).

Simply tunneling the SATA protocol through the SAS protocol using STP, however, consumes a significant portion of the SAS fabric bandwidth through handshake and keep alive communications. For example, this known tunneling approach has one or more of the following drawbacks: reduces the number of devices which can communicate in parallel over the SAS fabric; reduces the speed of the SAS fabric to the maximum speed of the SATA drive; and fails to take advantage of certain performance-enhancing features in the SAS protocol.

Improvements in the transmission of SATA information are desirable.

BRIEF DESCRIPTION OF THE DRAWINGS

Embodiments of the present disclosure will now be described, by way of example only, with reference to the attached Figures.

FIG. 4 illustrates a frame header for use in accordance with an example embodiment of the present disclosure.

FIG. 5 illustrates a command information unit for use in accordance with an example embodiment of the present disclosure.

FIG. 6 illustrates a response information unit for use in accordance with an example embodiment of the present disclosure.

FIG. 7 illustrates a data request information unit for use in accordance with an embodiment of the present disclosure.

DETAILED DESCRIPTION

Figure 1:
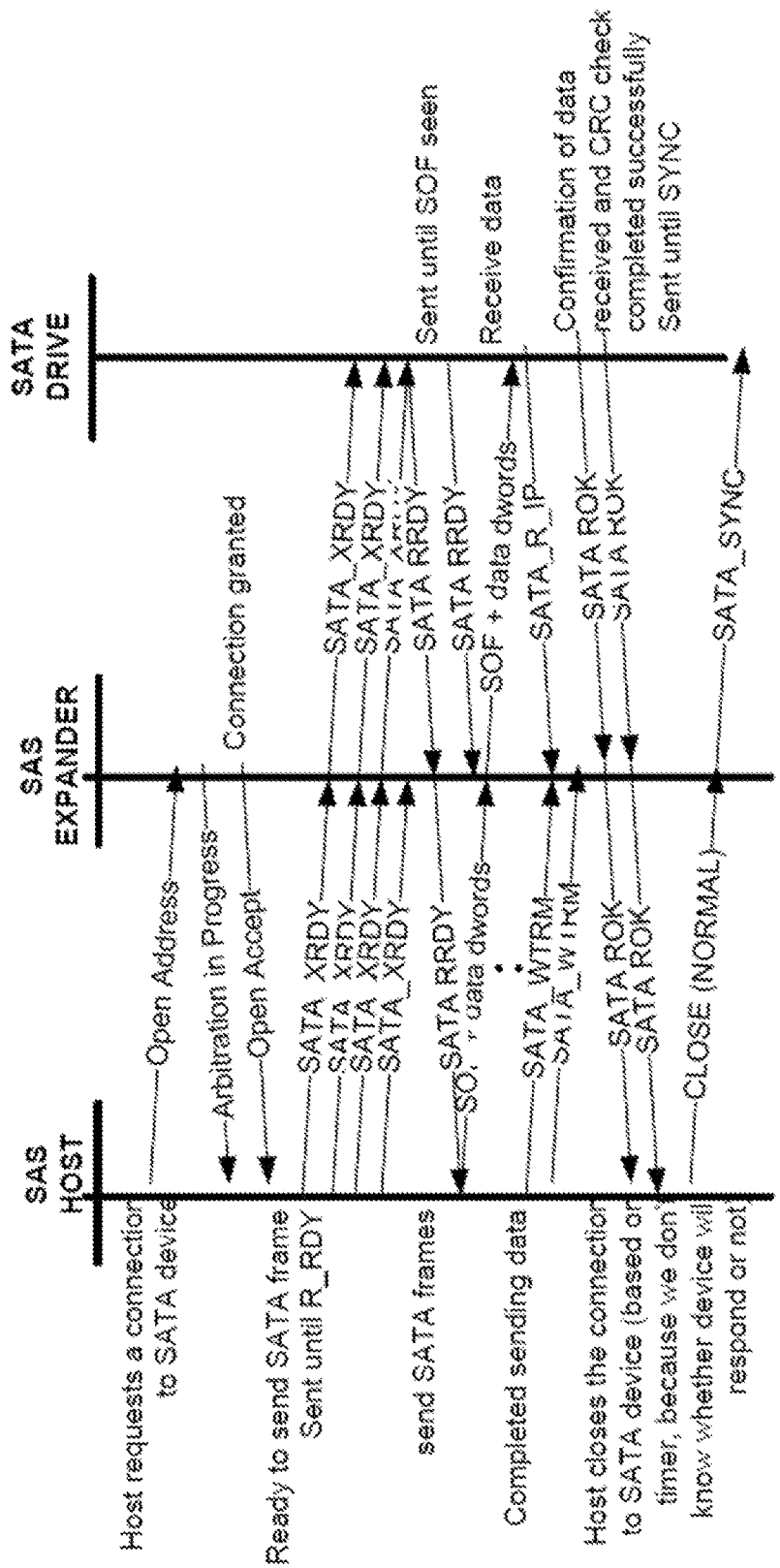
FIG. 1 illustrates a known method of transmitting a frame with STP.

A method and system are provided for transmitting SATA (serial advanced technology attachment) information. In an implementation, SATA information is transmitted over a SAS (Serial Attached SCSI) fabric. In another implementation SATA commands, rather than SCSI (Small Computer System Interface) commands, are passed to an expander. In an example implementation, SATA protocol elements are encapsulated or translated into SAS-like frames and transmitted using SSP (Serial SCSI protocol) and using SSP hardware.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

Embodiments of the present disclosure provide a method and host system and serial attached SCSI (SAS) expander/controller which translates or transports serial ATA (SATA) information using SAS frames within the SAS protocol.

SATA drives can transfer data at up to 6 gigabits per second (Gb/s) yet the SAS protocol permits data transfers at up to 12 GB/s and will soon permit data transfers at up to 24 GB/s.

Embodiments of the present disclosure provide a method and host system and SAS expander/controller which acts as a bridge or translator between SATA drives and other devices on the SAS fabric. In an embodiment, the method addresses deficiencies in the STP protocol while still presenting a full SATA FIS (frame information structure). In an example implementation, the host adapter does not translate but rather recreates the same content on both ends.

For example, in an embodiment, the adapter encapsulates the SATA FIS in an SSP frame to send the FIS toward the device, and removes the encapsulation when it receives one from the device. The expander removes the encapsulation when it receives an encapsulated FIS from the adapter and forwards the FIS to the device. The expander encapsulates FISs received from the device before forwarding them to the adapter.

Embodiments of the present disclosure provide a transport between an adapter and an expander to transport the essential elements of ATA protocol, embedded in SAS frames, and transported using SAS protocol, in order to operate an ATA device. The SAS headers provide the information about the nature of the protocol element (e.g., command/status/data/data request) and identification of the particular operation (i.e., tag), so that this information need not be maintained by means of atomic sequences of frames.

Embodiments of the present disclosure change how the ATA protocol is handled between a host adapter or RAID controller, both referred to generically as a host controller, and the expander connected to the device. In the case of multiple expanders in the path, the same protocol is used between expanders as between host and expander.

Embodiments of the present disclosure represent a significant change from the philosophy of STP (SATA Tunneling Protocol) in several respects:

1) The host does not maintain shadow registers. In particular, the state of BSY is not maintained in the host adapter.

2) STP-specific primitives are not used. In particular, X_RDY, R_RDY, WTRM, R_OK, R_ERR, HOLD, HOLDA are not used.

3) Only a subset of protocol elements is transmitted, for example: Command, Response, Data Request, Data. In an embodiment, this subset of protocol elements comprises essential protocol elements. These protocol elements are encapsulated in SAS frames, using the existing SAS frame types and headers (and, in the case of Data frames, the existing limits on frame size), using SAS protocol rules, and inside SAS connections.

4) ATA protocol elements such as D-H FISs that do not represent completions (i.e., those that indicate NCQ command acceptance), DMA SETUP/PIO SETUP on read commands, and DMA ACTIVATEs are not used.

SATA commands and SATA status/error are transported to/from the expander, but DMA SETUP/PIO SETUP on writes is converted into an XFER_RDY frame.

An NCQ error will be reported to the host in a form identifiable as an NCQ error, and the normal sequence of NCQ error reporting/recovery will be followed, including the host initiating a READ LOG (DMA) EXT and parsing the NCQ error log.

In an embodiment, each host maintains the same rules about concurrency and non-mixing of NCQ and legacy commands as today. The same drawbacks and limitations are present as with STP if the rules are violated.

The fact that a host is communicating with a SATA device is assumed to be mutually understood and agreed as a consequence of the discovery process, so the recipient of frames understands the context (e.g., a Command sent to a SAS device is understood to contain a LUN and SCSI CDB, whereas a Command sent to a SATA device is understood to contain a SATA command FIS). The frame headers do not contain any information to distinguish SAS from SATA, or are free of such information, so that the hardware can operate without change.

Embodiments of the present disclosure assume a no-affiliation model, i.e., no affiliation is made between an initiator and target device, but rather operations are tracked by initiator WWN, initiator connection tag, and task tag. There is no mechanism to return STP RESOURCES busy for SSP connections.

FIG. 1 illustrates a known method of transmitting a frame with STP. Note that, in FIG. 1, the connection between host and expander is kept open (mostly transmitting primitives) during the end-to-end handshaking to obtain permission to send the frame, and acknowledgement that the frame has been received correctly by the drive. If either side wishes to halt transfer of the frame during the frame transmission, they may do so, by means of a HOLD/HOLDA sequence; these sequences interrupt the flow of frame data, but are also performed inside the connection between host and expander. A link trace of the link between host and expander shows clearly that the fraction of the link bandwidth used to transfer information is rather small.

Figure 2:
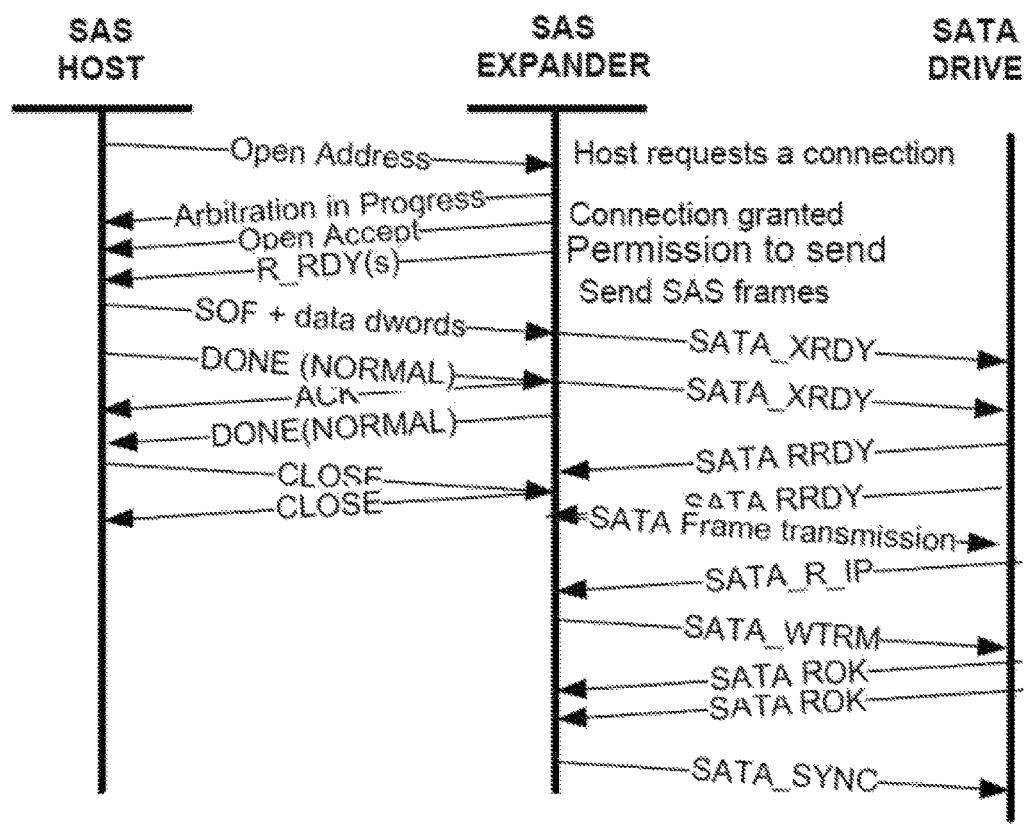
FIG. 2 illustrates a method of transmitting a frame with SSP according to an embodiment of the present disclosure.

FIG. 2 illustrates a method of transmitting a frame with SSP according to an embodiment of the present disclosure. As shown in FIG. 2, the connection is not held open during negotiation to send frame, transmission, and acknowledgement. This means that the connection can be used to communicate with other devices. This feature and advantage becomes a more significant benefit when the link speed on the SAS link is twice (12G SAS) or four times (24G SAS) the link speed on the ATA link (6G SATA).

In accordance with an embodiment of the present disclosure, the expander causes only SATA information units to be transported over the SAS fabric using the Serial SCSI Protocol (SSP protocol) rather than the entire SATA protocol including the information therein.

Embodiments of the present disclosure permit concurrent communication with many more SATA drives over a SAS fabric by reducing the keep alive communications, and eliminating the SATA handshake communications, over the SAS fabric which would otherwise consume significant bandwidth and reduce the speed of communications.

In an embodiment, the expander eliminates SATA frames comprising SATA handshake communications. In another embodiment, the expander and adapter manage connections more efficiently using the native SSP protocol connection management.

Figure 3:
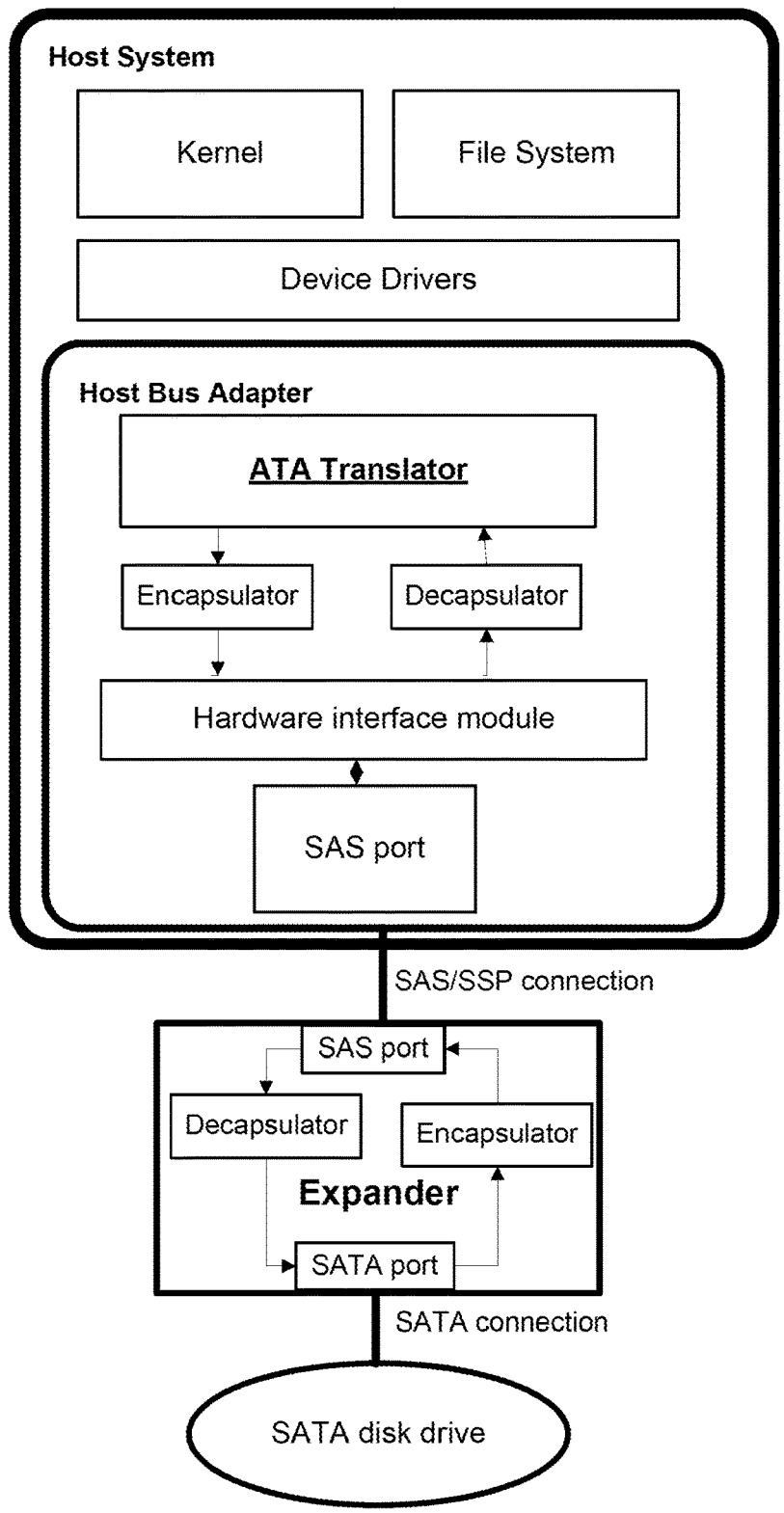
FIG. 3 illustrates a system for SATA information transmission according to an example embodiment of the present disclosure.

FIG. 3 illustrates a system for SATA information transmission according to an embodiment of the present disclosure. As shown in FIG. 3, the translation and queue management is performed in the host system. This is in contrast to known approaches in which, for example, translation of SCSI commands to SATA is performed in a component separated by a SAS network from the host system. An advantage provided by such an embodiment is that the supported queue depth of the SATA device is exposed to the host, so that any needed queueing and serialization (NCQ vs non-NCQ) is performed in the host, which has resources to manage the queue, rather than in the expander, which does not.

In the example embodiment of FIG. 3, the SATA commands and other protocol units are sent using SSP protocol. In an example embodiment, the host system comprises a kernel, a file system and device drivers.

In the example embodiment of FIG. 3, the host system comprises a host bus adapter. The host bus adapter comprises an ATA translator, a first encapsulator, a first decapsulator, a hardware interface module, and a SAS port. The ATA translator performs translation into ATA, for example from SCSI commands. The encapsulator and decapsulator perform encapsulation and decapsulation, respectively on egress and ingress. The hardware interface module enables transmission of the encapsulated data over the SAS port.

Also shown in FIG. 3, a SAS Expander includes a first SAS port configured to transmit the SAS data over a SAS connection. The first SAS port is in communication with a second decapsulator and a second encapsulator. The SAS Expander also comprises a SATA port configured to transmit SATA data over the SATA connection to a SATA disk drive. In an example embodiment, the SAS Expander incorporates a switch, or switch function, which permits the expander to communicate with a plurality of SATA disk drives, or other SATA devices or endpoints.

Communication Protocol

FIGS. 4-7 illustrate frame formats for use in accordance with example embodiments of the present disclosure.

FIG. 4 illustrates a frame header for use in accordance with an example embodiment of the present disclosure. The usage of the fields in the header is consistent with SAS usage (for example in SAS Protocol Layer 3, or SPL-3). In particular, in this example embodiment, bits 13:0 of the Initiator tag are the index of the IOST entry (controlling data transfer) corresponding to the I/O request.

In the example embodiment of FIG. 4, the Frame Type field usage is the same as for SAS, except that the TASK frame type is not used. In an example implementation, for Soft Reset, Command frames are used without the C bit set, and the SRST bit is toggled in the Device Control field; for CHECK POWER MODE used as an abort mechanism, the command frame indicates ABRT. In an embodiment, the CRC is the CRC specified in SPL-3.

FIG. 5 illustrates a command information unit for use in accordance with an example embodiment of the present disclosure. Fields in bytes (0:19) are as described in SATA-IO 3.2. Note that Count(7:3) contains the SATA NCQ tag for READ FPDMA QUEUED, WRITE FPDMA QUEUED, FPDMA NON-DATA, FPDMA RECEIVE, and FPDMA SEND.

In an embodiment, the FFE bit is used to indicate that the expander should return the ending FIS even if the operation completes with GOOD status. This is required for handling of SMART RETURN STATUS and for ATA PASSTHROUGH CK_COND, and is not meaningful for PIO read-type commands or NCQ commands.

In an embodiment, the NCQRLE bit in FIG. 5 indicates that this READ LOG EXTENDED is reading the NCQ error log subsequent to reception of an error SDB. This flag is primarily relevant to MA environments, where the log may need to be remapped, changing tags to match the tags used by this initiator.

In an embodiment, the SRST bit in FIG. 5 indicates that this is a software reset of the drive, needs to be propagated regardless of BSY, and will not receive any response from the drive.

In an embodiment, the ABRT bit in FIG. 5 indicates that this non-NCQ command is to be sent to the drive, regardless of any outstanding NCQ commands, as it is intended to abort any NCQ requests.

In an embodiment, the RSV and REL bits in FIG. 5 indicate that these commands are RESERVE and RELEASE commands. The contents of bytes 0-19 are ignored. The expander uses the RESERVE to establish a reservation by the initiating host; the RELEASE clears the reservation. In an embodiment, the rules for commands from other hosts are as described in SPC-2r10 (SCSI Primary Commands—2, revision 10). These are only relevant if multi-access is supported. Any reservation is cleared if a host requests a HARD RESET via SMP PHY Control.

FIG. 6 illustrates a response information unit for use in accordance with an example embodiment of the present disclosure. In relation to FIG. 6, SDA=1 means sense data is present, RDA=1 means response data is present. Status=0 means good completion, and is generated whenever a good completion SDB or D-H is obtained. A good completion with multiple bits set in Sactive causes the presentation of multiple RESPONSE frames, with the Initiator Tag field set to match the Initiator Tag from the command that was transmitted with the tag with a 1 in Sactive. When Status=0, SDA, RDA, m and n are set to 0, and the RESPONSE frame only needs to be 24 bytes in length.

In relation to FIG. 6, if the expander receives an SDB or D-H FIS with ERROR or SDA set to 1 in the STATUS register, or if FFE was set in the Command frame, the following values are set: the Status field in the RESPONSE frame to 02h, set SDA=1b, set Sense Length=10h, and fill bytes 24:39 with the contents of the D-H or error SDB FIS, with byte 0 of the FIS placed in byte 24 of the response IU, and byte 15 of the FIS placed in byte 39 of the response IU.

In an implementation, in the single-host case, the SATA tag used by the expander is the tag used by the initiator, so the initiator tag reported is the one corresponding to the SATA tag reported in the device completion. In multi-access, a reverse mapping is used to find the correct initiator, initiator connection tag & initiator tag corresponding to each SATA completion. The tag reported in the completion will is the one used by the initiator, not the one returned by the device.

FIG. 7 illustrates a data request information unit for use in accordance with an example embodiment of the present disclosure. It is worth noting that the offset & size in the DMA SETUP FIS are little-endian, whereas the offset and size in this IU are big-endian.

The data IU in the example embodiment as shown in FIG. 7 is just 1024 bytes of data, unmodified. Each data frame received from the device is split into from 1 to 8 1024-byte data frames, with the RO field in the header incremented by 1024, and transmitted to the host. Only the last frame may be smaller than 1024 bytes.

On write-type commands, an 8K buffer is filled with 1K frames until filled or the request size from the DMA SETUP has been satisfied, and transmitted to the device.

Control

With respect to discovery, in an example embodiment a bit is added to the DISCOVER response for every SATA drive if the expander supports the capability, to indicate that it can use this protocol. In an example embodiment, a support bit is added in byte 15, bit 5 of a DISCOVER response.

A basic flow of command processing will now be described in relation to an example implementation.

In a method according to an example embodiment of the present disclosure, an adapter opens a SAS connection. On receipt of R_RDY, the adapter sends the command frame. When the command frame is acknowledged, the connection can be closed (following exchange of DONE).

The expander retains the initiator connection tag, initiator tag, and SAS address of initiator.

The expander then sends X_RDY to a drive; when the expander receives R_RDY, the command is sent to the drive. If the command was an NCQ command, the expander acknowledges and discards a good D-H FIS clearing BUSY. (If it was an error D-H, i.e., one that completes the command, open a SAS connection and send an error response as indicated above.)

A PIO_SETUP or DMA_SETUP for a read command is acknowledged and the tag matched with the initiator tag, initiator connection tag, and SAS address of the initiator as saved above, for opening the connection and creation of the frame headers for the subsequent data frames. The DMA_SETUP itself is NOT propagated to the host.

Data frames sent by the target device are split into 1K chunks. If the CRC is good, open a connection, prepend a SAS SOF and header to each 1K chunk, with RO incrementing by 400h for each frame, and a SAS CRC and EOF appended.

Reception of a PIO_SETUP or DMA_SETUP for a write-type command is acknowledged and, in addition to the lookup as indicated for read commands, the expander generates an XFER_RDY frame with the offset and length from the PIO/DMA_SETUP and sends it to the host.

Data frames sent by the host are assembled into 8K frames and transmitted to the device.

When an ending D-H or SDB FIS is received, if the STATUS field does not have the ERROR, SDA, or DF bits set, a GOOD completion is sent for each of the command(s) (an SDB may contain multiple bits set in Sactive, indicating the completion of multiple operations). An error D-H or SDB is reported as indicated earlier.

Hardware Interfaces

Embodiments of the present disclosure are designed to work with existing SAS RAID on chip controller hardware and expander hardware unchanged.

The initiator processing uses the existing ITC, IOST, and RQE structures. In an embodiment, sending these requests requires setting the bits to indicate this was an SSP command frame (HSST_RQE_Prot_SSP+HSST_RQE_FT_C-MND), with none of the SATA-related flags set. The indirection between SATA tag and IOST is not used, as the command frame and all subsequent frames contain the IOST index, which is used directly, as in other SSP commands. The response frame is designed to make a good SATA completion look like a good SSP completion, so it can be presented & processed in the fastpath as if it were a good SSP completion.

In an example implementation, it is expected that all connections would be opened at the negotiated rate between adapter and expander (i.e., not limited by the drive rate).

Expander processing can leverage the existing SSP interface logic and existing SATA drive logic, but in an example embodiment will require interception of protocol units between these interfaces. The amount of information required to be retained for the life of an operation is consistent with what would be required for an MA operation, so likely greater than that required for a single-host buffered expander. In an example implementation, this information includes: WWN of initiator sending this command from the OPEN; Initiator Connection tag from the OPEN; SATA tag from command FIS (note that this is not used except when updating RLE data); Initiator tag from command frame header; and SATA tag used when sent to drive.

Commands are accepted by the expander, so long as there are sufficient resources to maintain this information (and the buffered command frame until it is successfully delivered to the target device). If the expander does not have resources sufficient to do this, it responds with TASK SET FULL or BUSY (BUSY is only sent if there are no outstanding requests from this host to this target) responses (these values set in SCSI status, together with service action TASK COMPLETE). There is no occasion to present STP RESOURCES BUSY.

Data Flow

FIGS. 8-15 illustrate example data and command flows for different commands and SATA messages according to embodiments of the present disclosure. FIGS. 8-15 are simplified to omit connection management on the host side. For the purpose of these example illustrations, it is assumed that all frames sent between host and expander are transmitted inside SSP connections, using normal SSP flow control. Likewise, flow control on both sides of the link is not shown so as to make the flow of frames clearer.

Figure 8:
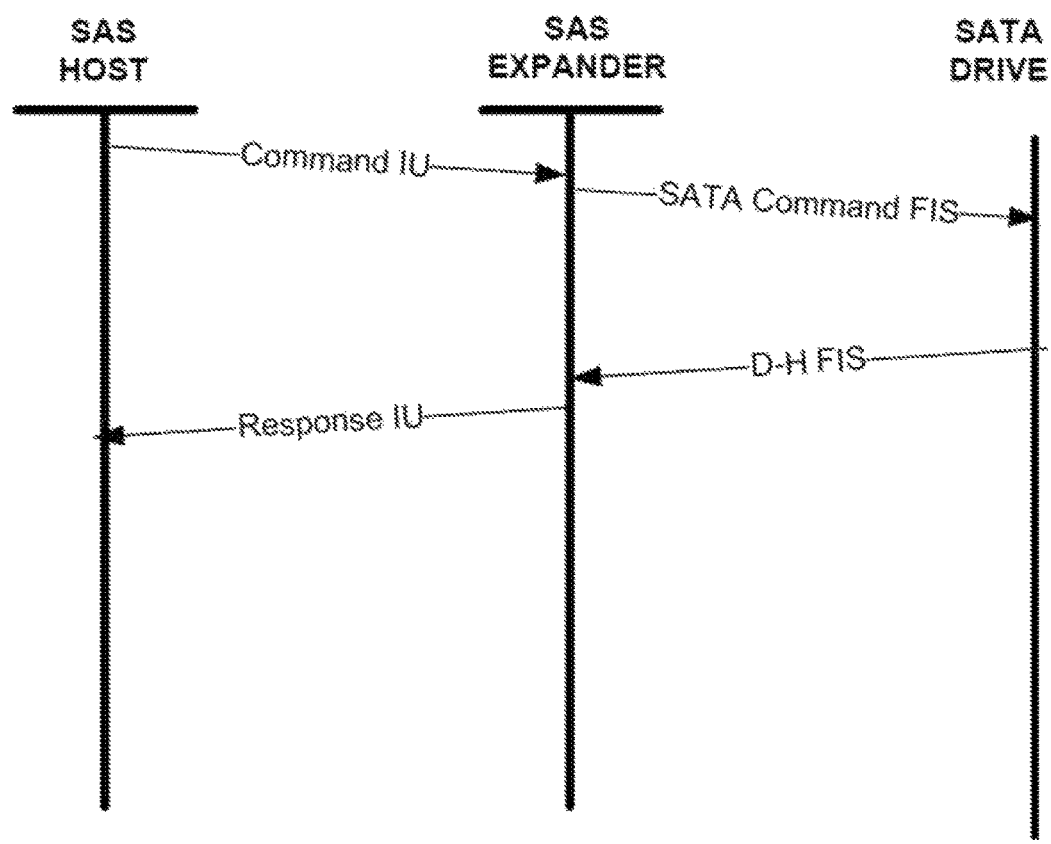
FIG. 8 illustrates a non-data command flow according to an example embodiment of the present disclosure.

FIG. 8 illustrates a non-data command flow according to an example embodiment of the present disclosure. The connection to the host may be closed after command reception. The expander waits until the device is idle and forwards the command to the device. When the device responds with A D-H completion FIS, the expander returns a good completion RESPONSE frame, if CHK/ERR is cleared to zero, or appropriate error sense, as described earlier. Note that if the command IU contained the FFE bit, the Response IU is sent with CHECK CONDITION status and the ending D-H FIS, even if the ending FIS does not have the CHK/ERR bit set (this is necessary so that the requestor can see the response from commands such as SMART RETURN STATUS or SANITIZE STATUS EXT that return information in registers even for successful completions).

Pending commands may be sent to the device after reception of the D-H FIS. If a NAK is received for the command IU, it is retransmitted.

If an ACK/NAK timeout is received for the command IU, a QUERY TASK is issued; the expander responds with whether or not it received the command successfully, and the command is retransmitted if not.

If the drive does not receive the command FIS correctly, it responds with R_ERR, and the command is retransmitted.

If the D-H FIS is not received correctly, the expander responds with R_ERR, and the response is retransmitted.

If the Response IU is not received correctly, the initiator responds with NAK and the Response IU is retransmitted with the RETRY bit set in the header.

If the expander gets an ACK/NAK timeout on the Response IU transmission, it closes the connection and retries the Response IU with the RETRY bit set in the header.

These recovery actions apply to recovery for errors in transmission of Command IUs and Response IUs for all protocols that follow.

Figure 9:
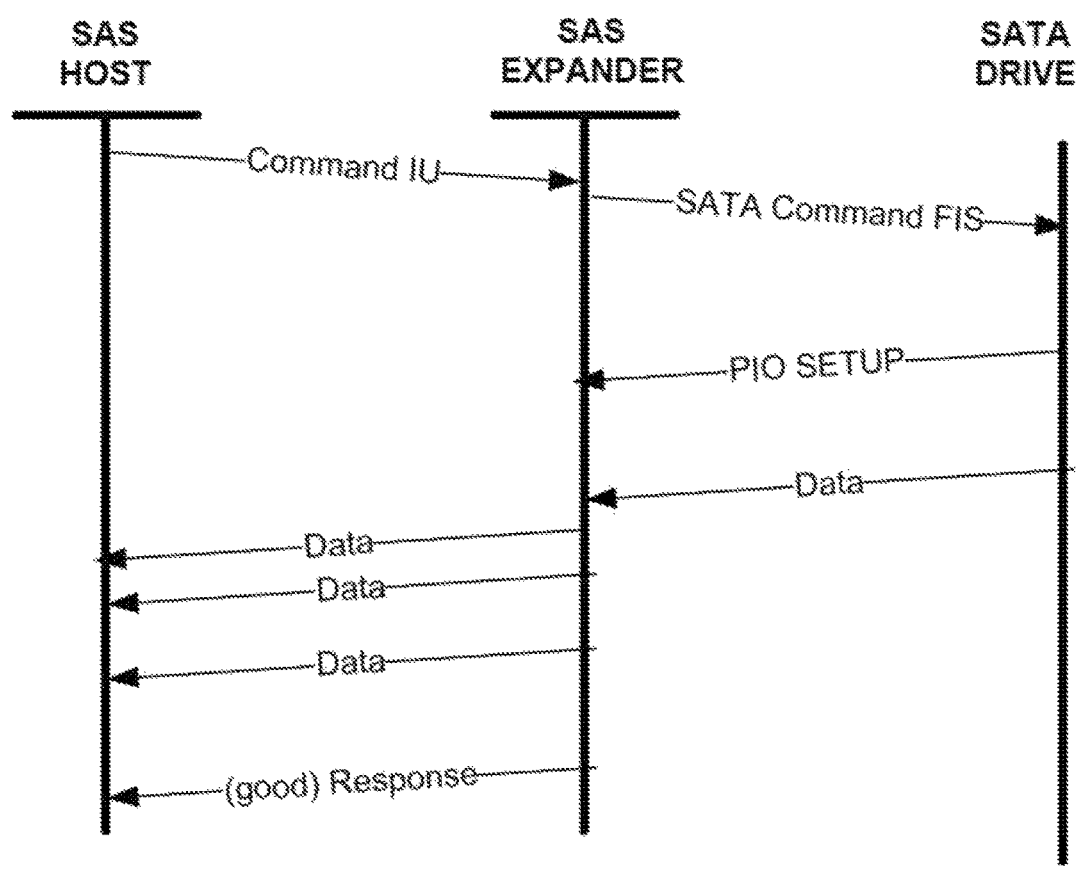
FIG. 9 illustrates a PIO data-in data flow according to an example embodiment of the present disclosure.

FIG. 9 illustrates a PIO data-in data flow according to an example embodiment of the present disclosure. The SATA Command FIS is extracted from the Command IU and transmitted to the device when all active and pending operations have completed.

The (good) response assumes that the PIO SETUP had a good Early Status value, else the drive wouldn't have sent data. If the PIO SETUP contains an error status in the E_S field, return that as ending status for the command.

Note that the PIO SETUP is not transferred to the host. If the data transfer completes normally, a good RESPONSE frame is transmitted for this (initiator) tag.

If there is an error in the PIO SETUP, the expander responds with R_ERR, and the drive is expected to retransmit the PIO SETUP.

If there is an error in the data frame received from the drive, the expander responds with R_ERR, and the drive is expected to retransmit the data frame.

If there is an error during data frame transmission between the expander and host, normal TLR rules are applied to retransmit the failed data frames, setting RETRY in the retransmitted frames, and CDP in the first retransmitted frame. In an implementation, for example if there is a significant disparity in link rates, in an embodiment it may be beneficial to transmit each 8K in a separate connection, so that TLR can always recover the transfer. Otherwise, the data to retransmit may no longer be available.

Figure 10:
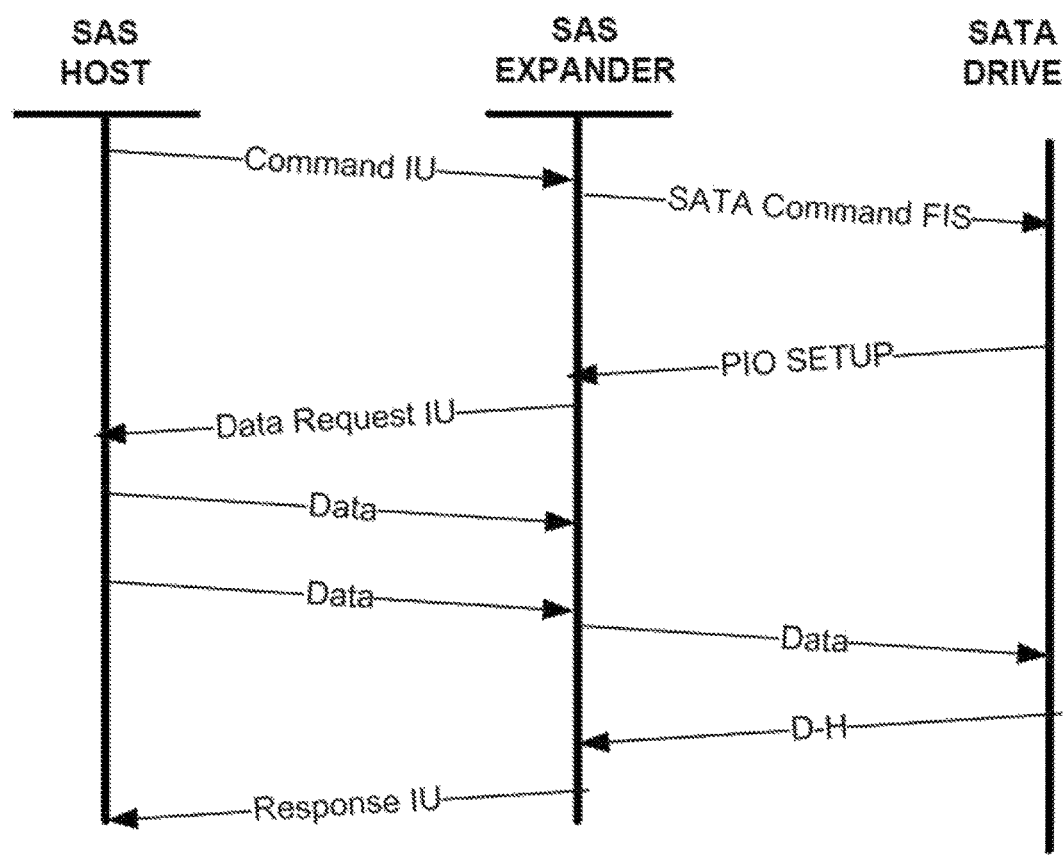
FIG. 10 illustrates a PIO data-out flow according to an example embodiment of the present disclosure.

FIG. 10 illustrates a PIO data-out flow according to an example embodiment of the present disclosure. The command FIS is extracted from the Command IU, and transmitted to the drive after all pending NCQ or non-NCQ commands have completed.

The PIO SETUP is used to create a Data Request IU, with the Initiator Tag from the command, and a size and offset from the PIO SETUP.

If an error occurs during the transmission of the PIO SETUP, the expander responds with R_ERR, and the device retransmits the frame. If an error occurs during the transmission of the Data Request (=XFER_RDY) IU, the expander retries the transmission, with RETRY set in the frame header (in a new connection if there was an ACK/NAK timeout).

Data IUs on the host-expander link may be retried (in a new connection if an ACK/NAK timeout), with RETRY set in the frame headers and CDP in the first retried frame, but an error on DATA from expander to device will result in the device terminating the operation with a D-H FIS with CHK/ERR set in status and ICRC set in error.

Figure 11:
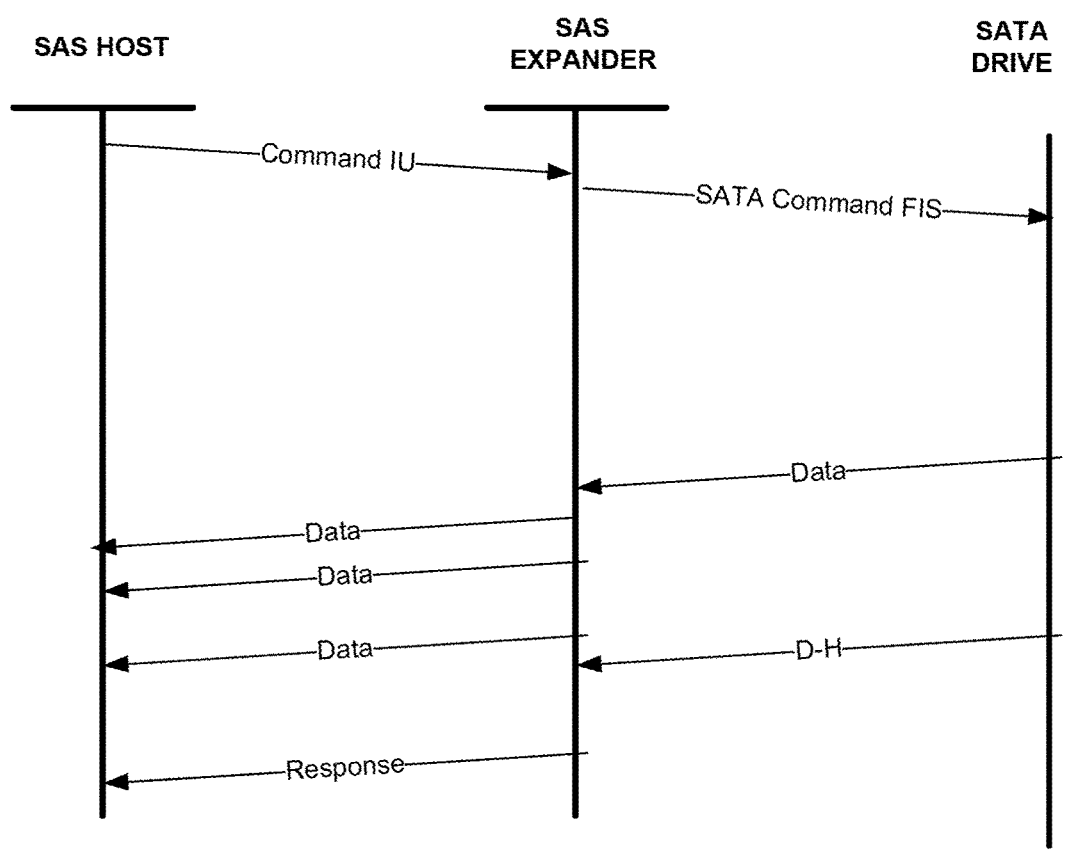
FIG. 11 illustrates a DMA data-in flow according to an example embodiment of the present disclosure.

FIG. 11 illustrates a DMA data-in flow according to an example embodiment of the present disclosure. Error handling for this flow is the same as for PIO Data-in, as shown in FIG. 9, except that there is no special E_S handling, as the device will respond with an error D-H FIS should device errors occur before or during data transfer.

Figure 12:
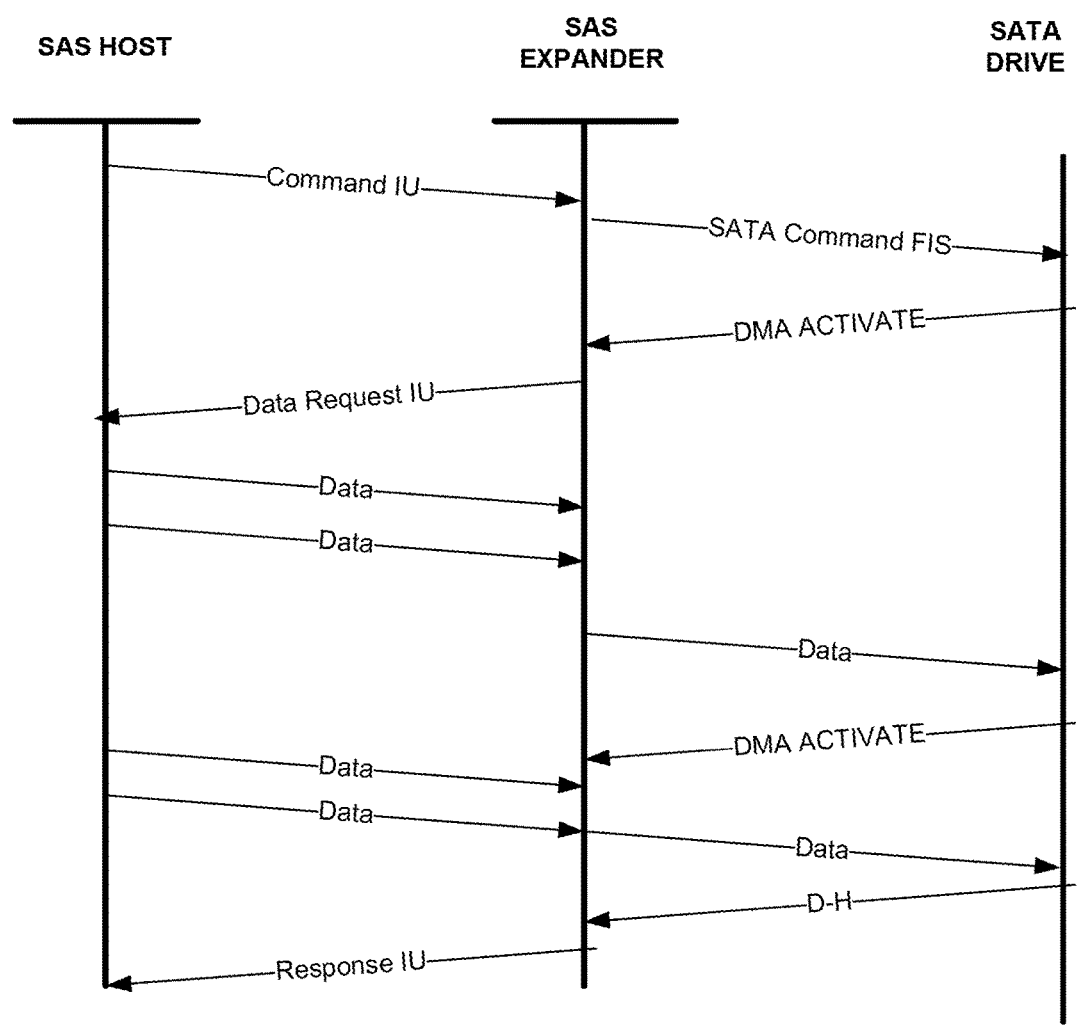
FIG. 12 illustrates a DMA data-out flow according to an example embodiment of the present disclosure.

FIG. 12 illustrates a DMA data-out flow according to an example embodiment of the present disclosure. Error handling in this case is the same as for PIO Data-Out, as shown in FIG. 10. As before, there is no retry for errors in outbound Data frames to the drive; this will result in an error completion with ICRC.

Figure 13:
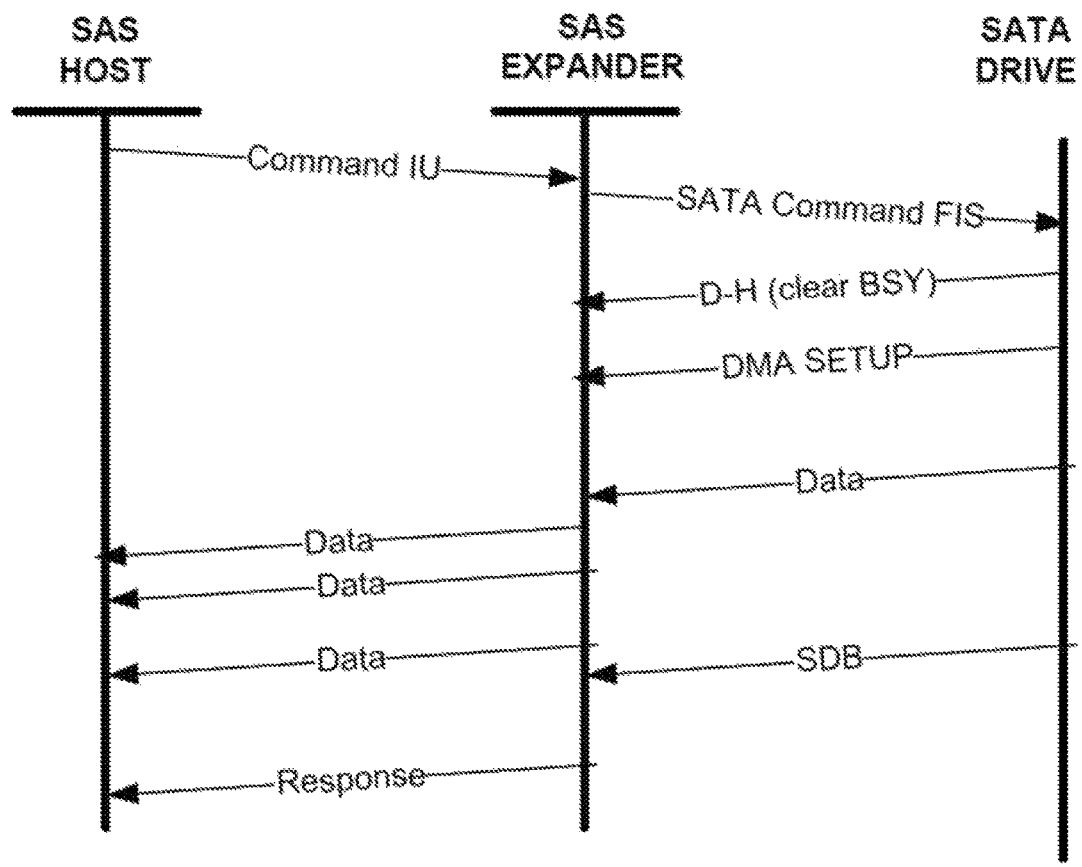
FIG. 13 illustrates a FPDMA data-in flow according to an example embodiment of the present disclosure.

FIG. 13 illustrates a FPDMA data-in flow according to an example embodiment of the present disclosure. Note that this flow includes READ FPDMA QUEUED and RECEIVE FPDMA QUEUED.

In the single-initiator case, the expander may use the NCQ tag allocated by the host, but in the multi-initiator case, it must decide first whether the device can accept the command at this time, and if so, assign an NCQ tag (possibly different from that used by the initiator).

Error handling for transmission errors of IUs is the same as for the DMA data-in case.

If the SDB contains ERROR set to zero, for each bit in SActive set to one, the expander generates a GOOD completion Response IU, as described earlier, to the host that initiated that operation, with the Initator tag corresponding to that operation.

If the D-H FIS or the SDB contains the ERROR bit set to one, the expander transmits an error SDB, as described earlier, to all hosts having outstanding NCQ commands, discarding any pending but untransmitted commands from those hosts. At this point the expander initiates an RL(D)E to the drive to obtain the NCQ error log. This is retained until a subsequent NCQ error occurs. When a host issues an RL(D)E, this log is modified to indicate either that the tag in error was a non-queued command (if that host did not initiate the actual tag in error), or that the tag in error was the tag used by that initiator when he initiated the command. The checksum in this modified log should be corrected appropriately.

Note that the handling of reads to logs other than log 10h are processed just as any other PIO/DMA/NCQ data-in command.

After processing the good SDB or the completion of the RLE, any remaining pending commands may be dispatched per normal rules.

Figure 14:
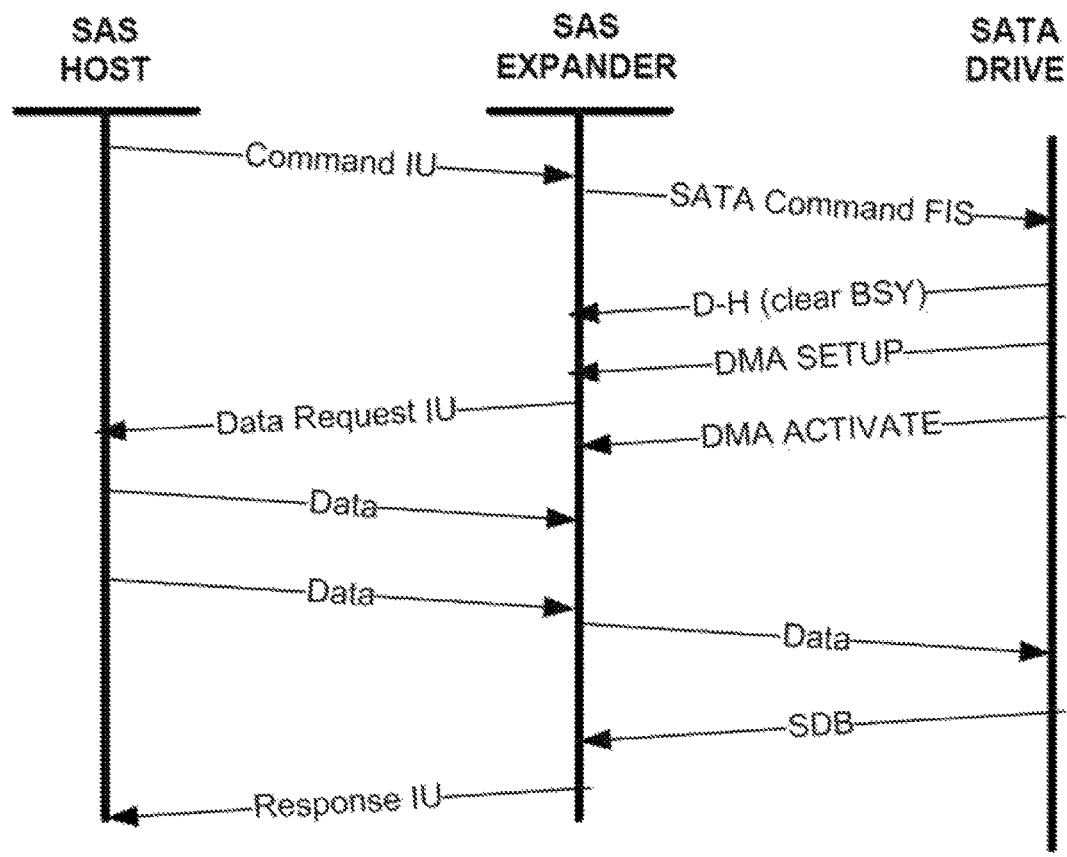
FIG. 14 illustrates a FPDMA data-out flow according to an example embodiment of the present disclosure.

FIG. 14 illustrates a FPDMA data-out flow according to an example embodiment of the present disclosure. Note that this flow includes both WRITE FPDMA QUEUED and SEND FPDMA QUEUED. Command initiation is as in the FPDMA Data-in case, as shown in FIG. 13. Frame transmission errors are handled as in the DMA data-out case, as shown in FIG. 10. NCQ error recovery is handled as for FPDMA Data-in.

Figure 15:
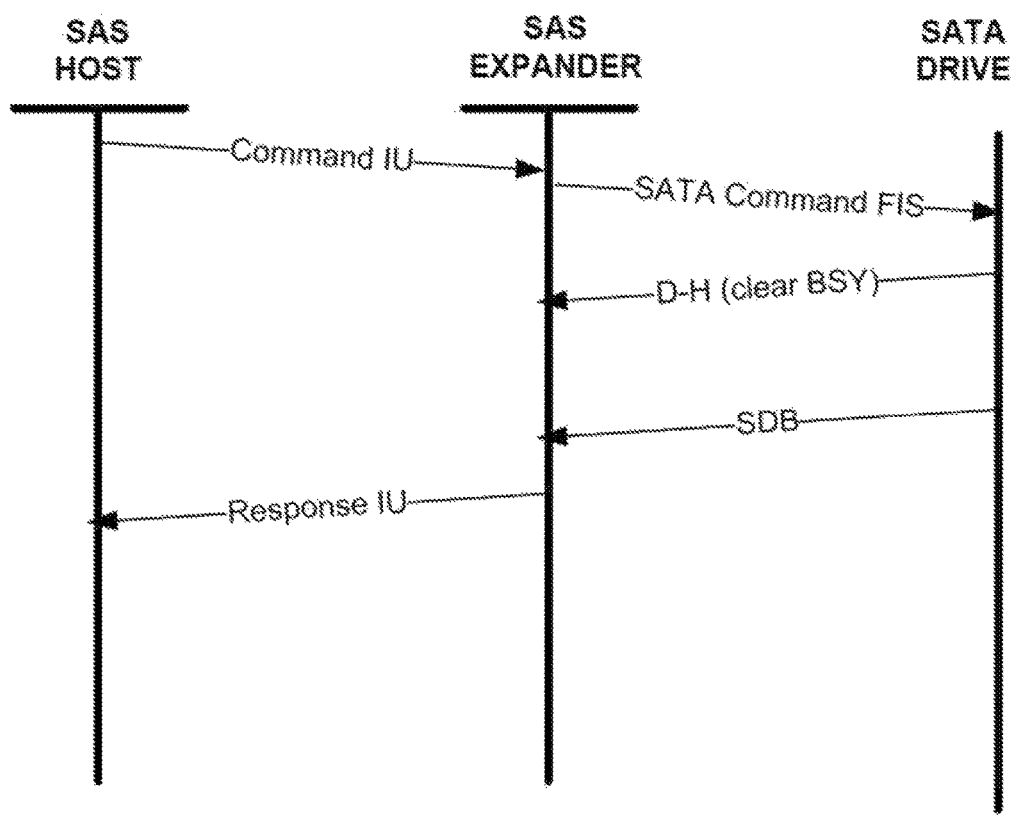
FIG. 15 illustrates NCQ non-data flow according to an example embodiment of the present disclosure.

FIG. 15 illustrates NCQ non-data flow according to an example embodiment of the present disclosure. Command initiation is as in the FPDMA Data-in case, as shown in FIG. 13. Frame transmission errors are handled as in the FPDMA Data-in case. NCQ error recovery is handled as for FPDMA Data-in.

In relation to FIG. 15, there are special considerations for the ABORT NCQ QUEUE subcommand of this command, if the ABORT TYPE field is set to 3h=ABORT SELECTED. In this case, the tag to be aborted needs to be changed to the NCQ tag of the command that was sent to the drive.

Host Link Reset Handling

A reset of the link to the host should not impact ongoing operations, except insofar as frames may be damaged in flight. Recovery from such damaged frames is performed as described above. In an embodiment, the host going away clears reservations; in another embodiment, that is left to the host wanting to steal the device via SMP HARD RESET.

In an embodiment, there should be no analog to Initiator Response Timeout. If that host returns to the fray (i.e., is rebooted), it will initiate a link reset to clear any outstanding commands. In an embodiment, the expander discards any outstanding requests after a preset timeout; otherwise, in another embodiment, those resources would be lost for a long while.

SMP Link/Hard Reset Handling

In an embodiment, if there is only one initiator, process as per the SPL-3 (SAS Protocol Layer) spec. Note that maintenance of the phy change count is the only way that the initiator can tell that the reset has been completed, as the response from the SMP request is immediate. (It must, per spec, be inside the same connection as the request, and therefore within 1 ms., so the reset is likely not to have completed; the spec does not require that the OOBs be initiated prior to sending the response.)

In another embodiment, if there is a second initiator, and the initiator of the SMP request (=port WWN) has no outstanding I/Os, return good completion and do nothing. If it does have outstanding I/Os, reset the link and send an error SDB (CHK/ERR=1, ABRT=1) to any other initiators having outstanding I/Os. Return a log containing 80h in byte 0 to their RL(D)E, having discarded all outstanding I/Os.

In an embodiment, a Hard reset clears any reservation, whether held by this initiator or another.

Link Reset Event Handling

This is distinguished from events where the host has asked the expander to reset the link, but instead the expander receives unsolicited OOBs.

First, in an embodiment, this will have caused the drive to have terminated any outstanding commands. Outstanding writes were in an indeterminate state—the data at the addressed LBAs could be unchanged, partially changed, or the operation may have completed successfully. In an embodiment, this applies not only to media operations, but also to log page writes, feature settings, etc. In an embodiment, the requestor needs to be made aware of this indeterminism.

Second, in an embodiment, this will have caused the presentation of one or more Broadcast Change primitives (while these are redundant primitives, i.e., the encoded primitive is sent twice, each instance of the doubled primitive counts as one Broadcast message).

In an embodiment, the fact that the state of the link changed when the link went down and again when it was recovered will cause the change count for the expander PHY to be incremented.

In an embodiment, the particular fault to be avoided is to report the drive is missing when a host queries the drive, but it is still present, just not up & online yet.

SRST Handling

Propagate to the device, followed immediately by a FIS clearing SRST. In an embodiment, it is undesirable to allow the possibility of a host leaving the device held in reset. In another embodiment, it may be necessary to withhold the BCC for the requesting host until after the SRST clear is received.

SRST Clear Handling

Discard, but present the BCC and show the device as up/available when it is.

(Multi-Access Extension) Support of RESERVE/RELEASE

In an embodiment, the RSV and REL bits in the Command IU indicate that these commands are RESERVE and RELEASE commands. The contents of bytes 0-19 are ignored. The expander uses the RESERVE to establish a reservation by the initiating host; the RELEASE clears the reservation. In an example embodiment, the rules for other commands allowed during RESERVE those for SANITIZE in progress:

IDENTIFY DEVICE
IDLE IMMEDIATE
READ LOG (DMA) EXT for logs 10h, 30h, and E0h
REQUEST SENSE DATA EXT
SECURITY UNLOCK
SMART RETURN STATUS Other commands received from hosts other than the one holding the reservation receive RESERVATION CONFLICT status (18h).

In an embodiment, these are only relevant if multi-access is supported. Any reservation is cleared if a host requests a HARD RESET via SMP PHY Control.

Embodiments of the present disclosure provide a system and method to translate or transport SATA information using SAS frames within the SAS protocol. Embodiments of the present disclosure provide performance-enhancing features with respect to the SAS protocol, for example by reducing the keep alive and handshake communications which would otherwise consume significant SAS fabric bandwidth and reduce the speed of communications. Example embodiments of the present disclosure reduce or eliminate tunneling of SATA protocol and improve efficiency of SAS link utilization and performance. Example embodiments of the present disclosure reduce or eliminate SATA specific buffering and 20 DWORD response time requirements. Example embodiments of the present disclosure have no need for speed matching to 6G connection.

Embodiments of the present disclosure improve support and performance for SATA devices attached to a SAS fabric. A method according to an example embodiment encapsulates and transports ATA information units within the SAS protocol, rather than known methods that tunnel the ATA protocol.

Example embodiments of the present disclosure are implemented in a SAS expander and SAS controller device, for example in a buffered expander.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of facilitating communications between a host device and a serial advanced technology attachment (SATA) target device over a serial attached small computer system interface (SAS) fabric, comprising:
   translating, at the host device, a Small Computer System Interface (SCSI) command into a SATA command, wherein the SATA command is included in one or more SATA information units;
   encapsulating, at the host device, the one or more SATA information units into a SAS frame to generate a modified SAS frame;
   sending the modified SAS frame to an expander device using a Serial SCSI protocol (SSP);
   decapsulating, at the expander device, the one or more SATA information units; and
   transmitting the unencapsulated one or more SATA information units over a SATA connection to the SATA target device.

2. The method of claim 1 wherein the sending the modified SAS frame uses a SSP transport protocol but not a SATA transport protocol or a serial ATA tunneling protocol (STP).

3. The method of claim 1 wherein the sending the modified SAS frame to the expander device is performed without involving any SATA frames comprising SATA handshake communications.

4. A system comprising:
   a host device comprising a host bus adapter configured to translate a Small Computer System Interface (SCSI) command into a serial advanced technology attachment (SATA) command, wherein the SATA command is included in one or more SATA information units, the host bus adapter further configured to encapsulate the one or more SATA information units into a serial attached SCSI (SAS) frame to generate a modified SAS frame, the host device configured to send the modified SAS frame using a Serial SCSI protocol (SSP); and
   an expander device configured to receive the modified SAS frame using SSP, to decapsulate the one or more SATA information units, and to transmit the unencapsulated one or more SATA information units over a SATA connection to a SATA target device.

5. The system of claim 4 wherein the host device is configured to send the modified SAS frame using a SSP transport protocol but not a SATA transport protocol or a serial ATA tunneling protocol (STP).

6. The system of claim 4 wherein the expander device and the host bus adapter manage connections using native SSP protocol connection management.

7. The system of claim 4 wherein the host device is configured to send the modified SAS frame to the expander device without involving any SATA frames comprising SATA handshake communications.

8. The system of claim 4 wherein the host device is configured to send the modified SAS frame without using any serial ATA tunneling protocol (STP) specific primitives.

9. The system of claim 4 wherein the host bus adapter is configured to encapsulate the one or more SATA information units into the SAS frame using SAS frame types and headers.

10. The system of claim 4 wherein the one or more SATA information units comprises at least one SATA command information unit.

11. The method of claim 1 wherein the sending the modified SAS frame is performed without using any serial ATA tunneling protocol (STP) specific primitives.

12. The method of claim 1 wherein the encapsulating the one or more SATA information units into the SAS frame involves using SAS frame types and headers.

13. The method of claim 1 wherein the one or more SATA information units comprises at least one SATA command information unit.

14. An expander device for communicating information between a host device and a serial advanced technology attachment (SATA) target device, the expander device comprising:

- a Serial Attached small computer system interface (SCSI) (SAS) port configured to receive a modified SAS frame using serial SCSI protocol (SSP), wherein the modified SAS frame comprises one or more SATA information units encapsulated into a SAS frame, wherein a SATA command is included in the one or more SATA information units, and wherein the SATA command was previously translated from a SCSI command at the host device;
- a decapsulator for decapsulating the one or more SATA information units from the received modified SAS frame;
- a SATA port for sending the one or more unencapsulated SATA information units to the SATA target device over a SATA connection.

15. The expander device of claim 14 configured to receive the modified SAS frame using a SSP transport protocol but not a SATA transport protocol or a serial ATA tunneling protocol (STP).

16. The expander device of claim 14 configured to receive the modified SAS frame from a host device without involving any SATA frames comprising SATA handshake communications.

17. The expander device of claim 14 configured to receive the modified SAS frame from a host device without the use of any serial ATA tunneling protocol (STP) specific primitives.

* * * * *